United States Patent
Dorenbosch et al.

(12) 
(10) Patent No.: US 6,429,771 B1
(45) Date of Patent: *Aug. 6, 2002

(54) METHOD AND APPARATUS FOR LIMITING MESSAGE LOSS AND MESSAGE LATENCY IN A MESSAGING SYSTEM

(75) Inventors: Jheroen Pieter Dorenbosch, Paradise; Richard Lionel Bennett, Southlake, both of TX (US); Soeren Henrik Thomsen, Gentofte (DK)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,195

(22) Filed: Apr. 27, 1999

(51) Int. Cl.[7] .............................. G08B 5/22; H04Q 1/30; H04Q 7/00
(52) U.S. Cl. .................... 340/7.28; 340/7.46; 340/7.24; 370/229; 370/314
(58) Field of Search .............................. 455/31.1, 31.2, 455/31.3, 518, 519, 520, 466; 340/825.26, 825.44, 825.47, 825.27, 825.04, 7.46–7.48, 7.43, 7.24, 7.28; 370/310, 311, 522, 229, 336

(56) References Cited

U.S. PATENT DOCUMENTS 6,081,202 A  *  6/2000  Dorenbosch ........... 340/825.44

* cited by examiner

Primary Examiner—Doris H. To
Assistant Examiner—James K Moore
(74) Attorney, Agent, or Firm—R. Louis Breeden; Roland K. Bowler, II (57) ABSTRACT

A messaging system transmits to a subscriber unit (122) on a plurality of channels (410) operating concurrently. The system transmits (1108) control information for the subscriber unit on a control channel assigned to the subscriber unit, and transmits (1110) a personal message fragment intended for the subscriber unit on a first channel. The system also transmits (1112) a group-call message fragment that may be intended for the subscriber unit on a second channel. Before transmitting, the system schedules (1106) the transmission such that the probability that the personal and group-call message fragments will overlap temporally with one another and that either of the fragments will overlap temporally with the control information is reduced.

25 Claims, 6 Drawing Sheets

METHOD AND APPARATUS FOR LIMITING MESSAGE LOSS AND MESSAGE LATENCY IN A MESSAGING SYSTEM

FIELD OF THE INVENTION

This invention relates in general to communication systems, and more specifically to a method and apparatus for limiting message loss and message latency in a messaging system.

BACKGROUND OF THE INVENTION

Information Services (IS) messages are becoming increasingly popular in today's wireless messaging systems. The IS messages can provide periodic reporting of stock quotes, sports scores, news, weather, and other information that may be of general interest. Such messages preferably are sent as group-call messages to conserve air time. A group-call message is addressed to a single address and will be received and decoded by a plurality of subscriber units that have subscribed to the particular type of information service associated with the address, e.g., news. Individual subscriber units can subscribe to multiple types of information services, up to the capacity of the subscriber unit to store IS addresses.

For added capacity, many messaging systems operate on a plurality of logical channels which operate concurrently. Each subscriber unit is assigned to one of the logical channels as its control channel. The subscriber unit monitors the control channel for IS and personal addresses active in the subscriber unit. When the subscriber unit decodes one of its personal or IS addresses, it then continues to monitor the control channel for a vector which will tell the subscriber unit what channel and what time slot it should go to in order to receive its message (or fragment thereof).

In prior art systems, the devices which schedule transmissions of addresses and message fragments on multiple logical channels have ignored possible conflicts among all the addresses programmed into each subscriber unit. As a result, some messages have been delivered with higher latency than desired, while other messages have been missed altogether, as will be explained further below.

Thus, what is needed is a method and apparatus that can limit missed messages and high latency that can result when a mix of personal messages and group-call messages exist in a multi-channel messaging system.

SUMMARY OF THE INVENTION

An aspect of the present invention is a method for limiting message loss and message latency in a messaging system which transmits to a subscriber unit on a plurality of logical channels operating concurrently. The method comprises the steps of transmitting control information for the subscriber unit on a control channel assigned to the subscriber unit, and transmitting a personal message fragment intended for the subscriber unit on a first logical channel. The method further comprises the steps of transmitting a group-call message fragment that may be intended for the subscriber unit on a second logical channel, and before the transmitting steps, scheduling the transmitting steps such that a probability that the personal and group-call message fragments will overlap temporally with one another and that either of the fragments will overlap temporally with the control information is reduced.

Another aspect of the present invention is a controller for limiting message loss and message latency in a messaging system which transmits to a subscriber unit on a plurality of logical channels operating concurrently. The controller comprises a network interface for receiving messages to be transmitted, and a processing system coupled to the network interface for processing the messages. The controller further comprises a base station interface coupled to the processing system for controlling a transmitter to transmit the messages. The processing system is programmed to cooperate with the transmitter to transmit control information for the subscriber unit on a control channel assigned to the subscriber unit, and to cooperate with the transmitter to transmit a personal message fragment intended for the subscriber unit on a first logical channel. The processing system is further programmed to cooperate with the transmitter to transmit a group-call message fragment that may be intended for the subscriber unit on a second logical channel; and before enabling a transmission of the control information and the fragments, to schedule the transmission such that a probability that the personal and group-call message fragments will overlap temporally with one another and that either of the fragments will overlap temporally with the control information is reduced.

DETAILED DESCRIPTION OF THE DRAWINGS

Figure 1:
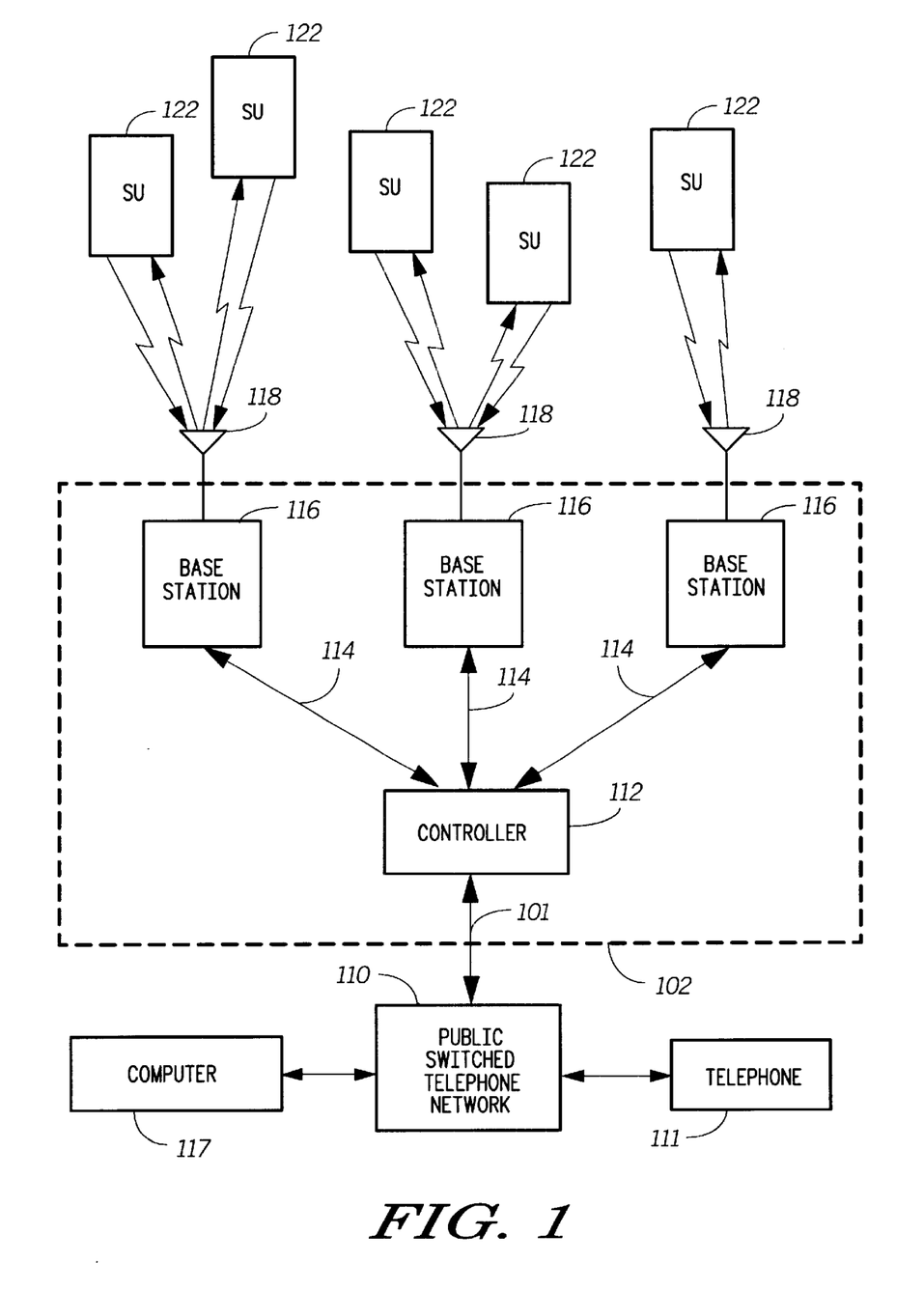
FIG. 1 is an electrical block diagram of an exemplary messaging system in accordance with the present invention.

FIG. 1 is an electrical block diagram of an exemplary messaging system in accordance with the present invention, comprising an infrastructure portion 102 including a controller 112 and a plurality of conventional base stations 116, the communication system also including a plurality of subscriber units 122. The base stations 116 preferably communicate with the subscriber units 122 utilizing conventional radio frequency (RF) techniques, and are coupled by conventional communication links 114 to the controller 112, which controls the base stations 116.

The controller 112 is preferably a combination of a Choreographer!® network management device, a Wireless Messaging Gateway (WMG™) Administrator!™ terminal, an RF-Usher!™ multiplexer, and an RF-Conductor!® message distributor manufactured by Motorola, Inc., and utilizes software modified in accordance with the present invention. It will be appreciated that the devices forming the controller 112 do not have to be collocated, and can be distributed. The base stations 116 are preferably a combination of the RF-Orchestra!™ transmitter and the RF-Audience!® receiver manufactured by Motorola, Inc. The subscriber units 122 are preferably similar to PageWriter® 2000 data subscriber units, also manufactured by Motorola, Inc., and also utilize software modified in accordance with the present invention. It will be appreciated that other similar hardware can be used as well for the controller 112, the base stations 116, and the subscriber units 122.

Each of the base stations 116 transmits RF signals to the subscriber units 122 via an antenna 118. The base stations 116 preferably each receive RF signals from the plurality of subscriber units 122 via the antenna 118. The RF signals transmitted by the base stations 116 to the subscriber units 122 (outbound messages) comprise selective call addresses identifying the subscriber units 122, and data messages originated by a message originator, as well as commands originated by the controller 112 for adjusting operating parameters of the radio communication system. The RF signals preferably transmitted by the subscriber units 122 to the base stations 116 (inbound messages) comprise responses that include scheduled messages, such as positive acknowledgments (ACKs) and negative acknowledgments (NAKs), and unscheduled messages, such as registration requests and requests for items of information.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. It will be appreciated that, alternatively, other types of networks, e.g., a local area network (LAN), a wide area network (WAN), and the Internet, to name a few, can be used for receiving selective call originations.

The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. While the wireless system depicted in FIG. 1 is a two-way wireless messaging system, many aspects of the present invention also are applicable to a one-way wireless messaging system, as well.

Figure 2:
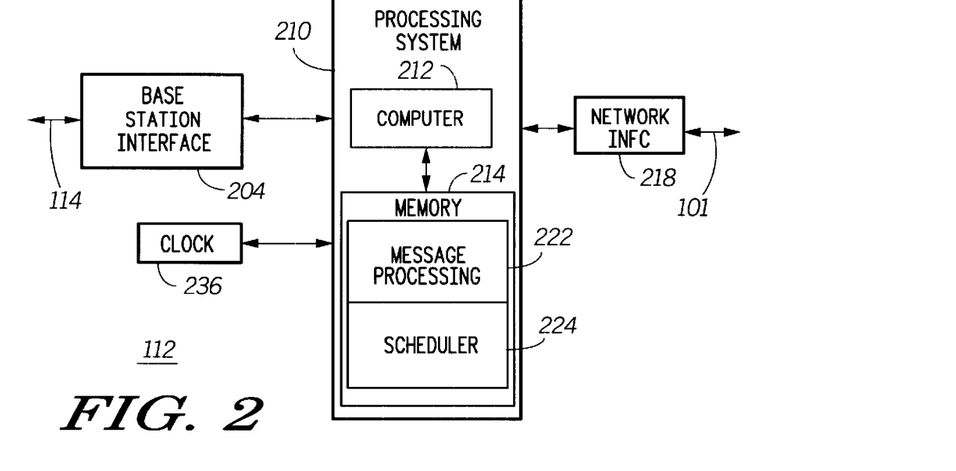
FIG. 2 is an electrical block diagram of an exemplary controller in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for controlling and communicating with the network interface 218. The processing system is coupled to a base station interface 204 for controlling and communicating with the base stations 116 via the communication links 114. The processing system 210 is also coupled to a conventional clock 236 for providing a timing signal to the processing system 210. The processing system 210 comprises a conventional processor 212 and a conventional memory 214, e.g., RAM, ROM, FLASH, or a magnetic disk drive, programmed with information and operating software in accordance with the present invention. The memory 214 comprises a conventional message processing program 222 for processing messages through well-known techniques. The memory 214 also includes a scheduler program 224 for scheduling addresses and message fragments in accordance with the present invention. Operation of the controller 112 in accordance with the present invention is described further below.

Figure 3:
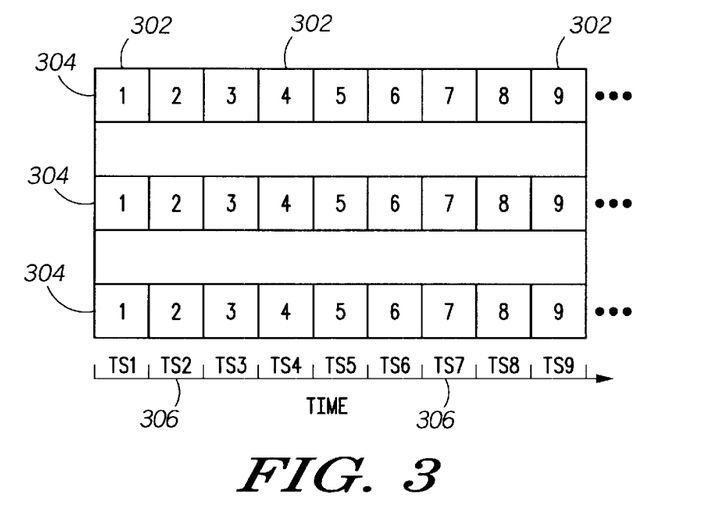
FIG. 3 is an exemplary timing diagram depicting frames of data on a plurality of logical channels operating concurrently in accordance with the present invention.

FIG. 3 is an exemplary timing diagram depicting frames 302 of data on a plurality of logical channels 304 operating concurrently in accordance with the present invention. The frames 302 are operated synchronously, all like-numbered frames occupying the same timeslot 306 on each of the logical channels 304. The logical channels 304 preferably operate on different radio frequencies, and each channel carries information different from that of any other channel. From none to all of the channels can be actively carrying messages during each time-slot 306, depending on the traffic load.

Figure 4:
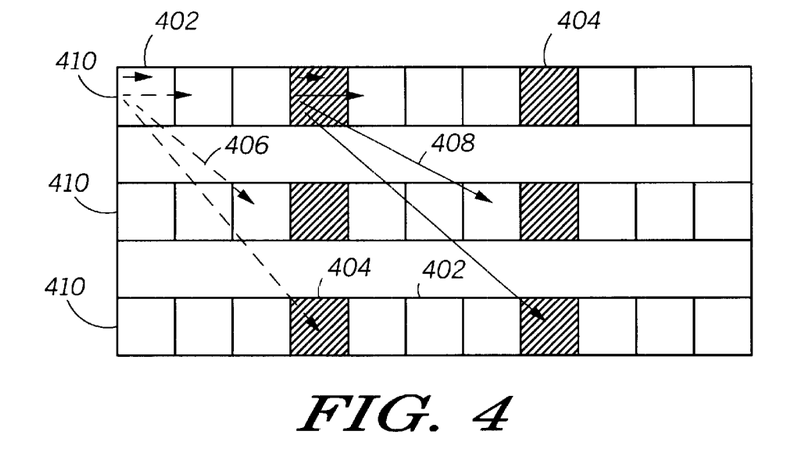
FIG. 4 is an exemplary timing diagram depicting the flexibility of message scheduling in the FLEX family of protocols.

FIG. 4 is an exemplary timing diagram depicting the flexibility of message scheduling in the FLEX family of protocols. In one version of the FLEX family, control information comprising the address and the vector for a message fragment are always in the same frame. The fragment can be in the same frame, in a later frame 402, 404 on the same channel 410, or in a later frame on another channel. The same is true for IS (group-call) messages. The protocol puts personal addresses in personal control frames 402 and Information Services addresses in IS control frames 404 (hatched). Vectors (dashed 406 for personal and solid 408 for IS) can point to message fragments in the same frame, in a later frame on the same channel, or in a later frame on a different channel. Hence, a frame can contain a mixture of personal and IS fragments. Any IS control frame 404 can also be a personal control frame and may contain a mixture of personal and IS addresses.

For IS messages the protocol has an additional rule: the IS control information comprising the IS address and vector must be replicated on all control channels. The protocol is designed such that only a single copy of the message fragment is needed. The vectors on the different channels then point to the single copy of the fragment. The time saved on the other channels can then advantageously be used for personal traffic, as shown in FIG. 5.

Figure 5:
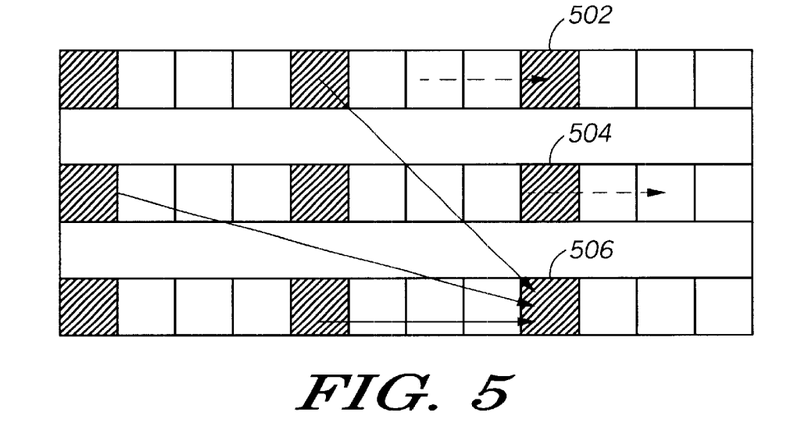
FIG. 5 is an exemplary timing diagram depicting potential scheduling problems in prior art systems.

FIG. 5 is an exemplary timing diagram also depicting potential scheduling problems in prior-art systems. Many subscriber units 122 have a personal address and several IS addresses. Prior art systems do not keep track of the correspondence between these addresses, and it is well possible that a subscriber unit 122 can be vectored to an IS fragment 506 at the same time that it is vectored to a personal two-way fragment 502 on another channel. The protocol has a conflict resolution rule that explicitly handles this case. The subscriber unit 122 must get the IS fragment and ignore the personal two-way fragment. This is done because two-way fragments will be repeated when they are lost.

A personal two-way fragment can even be lost due to IS traffic when it is not in an IS frame. This can happen if the two-way address for that fragment is in an earlier frame 504 that does overlap with IS traffic on another channel. The subscriber unit 122 may be vectored to the other channel to pick up the IS fragment 506 and will miss its address on its own control channel.

Figure 6:
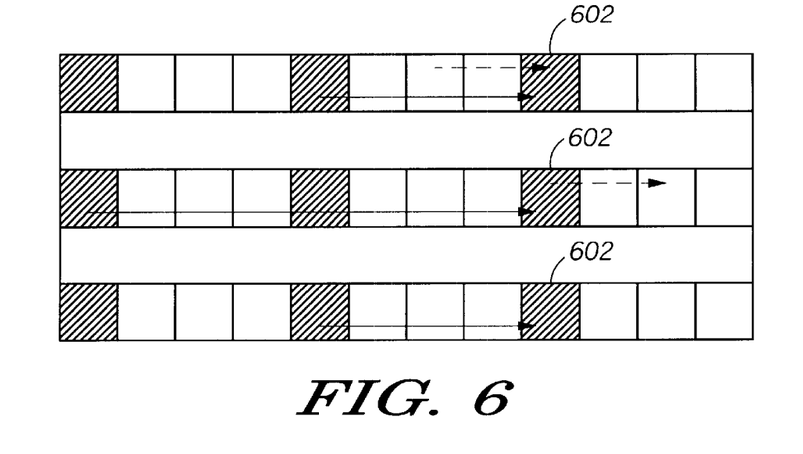
FIG. 6 is an exemplary timing diagram depicting a solution to the scheduling problems depicted in FIG. 5 in accordance with the present invention.

FIG. 6 is an exemplary timing diagram depicting a solution to the scheduling problems depicted in FIG. 5, in accordance with the present invention. The solution is to replicate each IS fragment 602 on each control channel. This way the subscriber unit 122 does not need to leave its control channel for the IS fragment 602 and will never miss any of its addresses. This solution preferably is used only when traffic is well below peak capacity.

Figure 7:
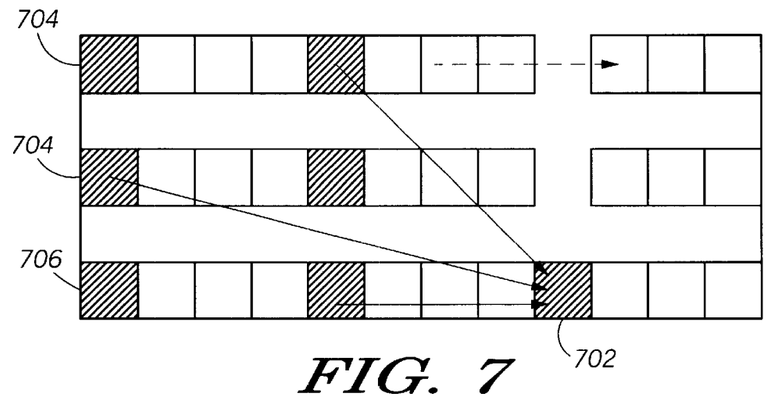
FIG. 7 is an exemplary timing diagram depicting a first alternative solution to the scheduling problems depicted in FIG. 5 in accordance with the present invention.

FIG. 7 is an exemplary timing diagram depicting a first alternative solution to the scheduling problems depicted in FIG. 5, in accordance with the present invention. The solution is simply not to use the frames on the other channels 704 in a time-slot during which an IS fragment 702 is sent on an IS channel 706. It will be appreciated that, alternatively, the other channels 704 can be used for another protocol or another system using the same protocol, during the time slot in which the IS fragment 702 is sent.

In spite of fragment repeats, a personal two-way message may still be completely missed due to IS traffic. This is because a fragment is repeated only a limited number of times. The service provider configures the maximum fragment repeat count.

Figure 8:
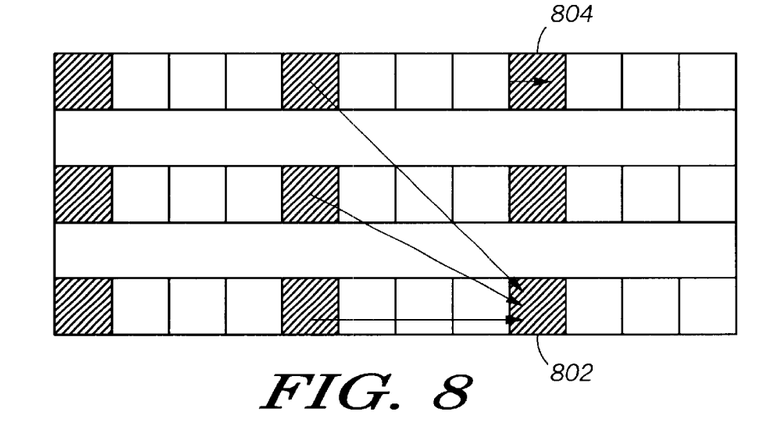
FIG. 8 is an exemplary timing diagram depicting a second alternative solution to one of the scheduling problems depicted in FIG. 5 in accordance with the present invention.

FIG. 8 is an exemplary timing diagram depicting a second alternative solution to one of the scheduling problems depicted in FIG. 5 in accordance with the present invention. A new way to avoid extra message loss due to IS traffic is to change the way fragment repeats are counted or limited:

a) The fragment repeat count is not incremented for a personal two-way fragment 804 that overlaps with an IS fragment 802 on another channel. In addition, when the corresponding address overlaps with IS traffic, the count is not incremented.

b) An alternative solution is to increment the maximum repeat count for such a fragment.

c) Another way to reduce message loss is to correlate fragment and address loss. As pointed out above, a personal two-way fragment can be lost two ways: by loosing the fragment, and by loosing the corresponding address and vector. These losses can be made to coincide by scheduling address and fragment 804 in the same frame if during that frame an IS fragment 802 appears on another channel.

d) Yet another version related to the above solution is the following: If a multi-fragment vector overlaps with IS on another channel, it preferably should point to as few as possible fragments that do not overlap with IS. One does not want to risk a large number of relatively safe fragments with an unsafe vector.

Another problem encountered when mixing personal and IS (group call) messages in a multi-channel system is increased message latency due to missed fragments and addresses. Such losses will increase message latency by at least one collapse cycle (i.e., the period between control frames looked at by the subscriber unit 122) as defined for the affected subscriber unit 122. One way to limit this problem is not to compromise fast messages. Most personal messages make it to the subscriber unit 122 on the first try, with very good latency. However, once a single fragment of a message has failed, the message latency is seriously compromised. To avoid spoiling a chance for good latency, one preferably uses fragments of messages that already have one missed fragment to fill frames that overlap with IS traffic on another channel. Also one preferably uses fragments of very long messages in such frames, especially if the fragments are the early ones of a message. If they are missed they can be repeated—with minimal latency increase—before the last fragment of the message will be transmitted. However, one does not want to be too harsh on repeated fragments. Hence, one preferably lets only one of the repeats of the same fragment overlap with IS traffic on another channel.

Figure 9:
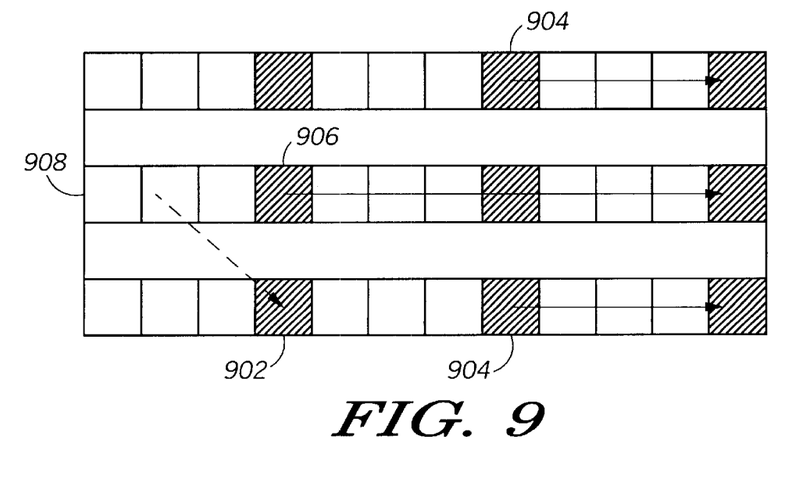
FIG. 9 is an exemplary timing diagram depicting another potential scheduling problem in prior-art systems.

FIG. 9 is an exemplary timing diagram depicting another potential scheduling problem in prior-art systems. Personal as well as IS fragments that are not on a pager's control channel 908 can lead to loss of an IS address. A subscriber unit 122 may miss the IS address 906 while it retrieves the fragment 902 on the other channel. Even though each IS address 904, 906 is replicated on each control channel, the copies of the IS address will not always appear in the same frame. If a subscriber unit 122 is vectored to pick up a fragment in an IS frame on another control channel it may miss an IS address on its own control channel, while that IS address is also not in the frame that the subscriber unit 122 has been vectored to. Hence, the IS address is missed.

One solution to the above problem is as follows. When a personal fragment is in an IS control frame, preferably put it on the pager's control channel. By not scheduling personal fragments on other channels during IS control frames, a subscriber unit will never miss an IS address.

Another way to obtain the same effect is to rigorously put the IS address copies in concurrent frames on all channels. Whatever control channel a pager is scheduled to go to, it will not miss the IS address.

Yet another solution is to have the system track which IS addresses are programmed with each personal address. This information is made available to the device that schedules the transmissions at the time of a personal message. The scheduling device avoids putting a personal address or a personal fragment in a frame while one of the corresponding IS addresses or a fragment on such address is sent during the same frame on another channel. Alternatively, one can send all personal addresses programmed with the IS address along with each IS message, and then schedule accordingly.

A more efficient solution is to tag the addresses of subscriber units 122 that are not programmed to decode any IS addresses. The messaging system includes a flag with a personal address to indicate to the scheduling device that subscriber unit 122 does not have any IS addresses. These addresses, and fragments on these addresses are then used to overlap with IS addresses and fragments on other channels.

Figure 10:
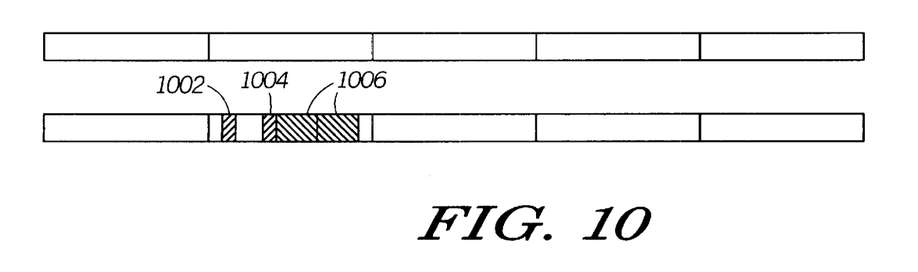
FIG. 10 is an exemplary timing diagram depicting a preferred scheduling technique in accordance with the present invention.

FIG. 10 is an exemplary timing diagram depicting a preferred scheduling technique in accordance with the present invention. A message fragment will be received only after the corresponding address and vector packets are received correctly. If the subscriber unit 122 successfully receives the address and vector packets, then that is an indication that the communication channel is of sufficient quality at that time and on that frequency. For this reason, to maximize the chance of successful message delivery, it is preferred to send the message fragment(s) on the same channel as the address and vector packets, and as soon as possible following the vector packet. FIG. 10 depicts the ideal case in which the fragments 1006 are sent on the same channel immediately after the address 1002 and vector 1004 packets have been sent.

Figure 11:
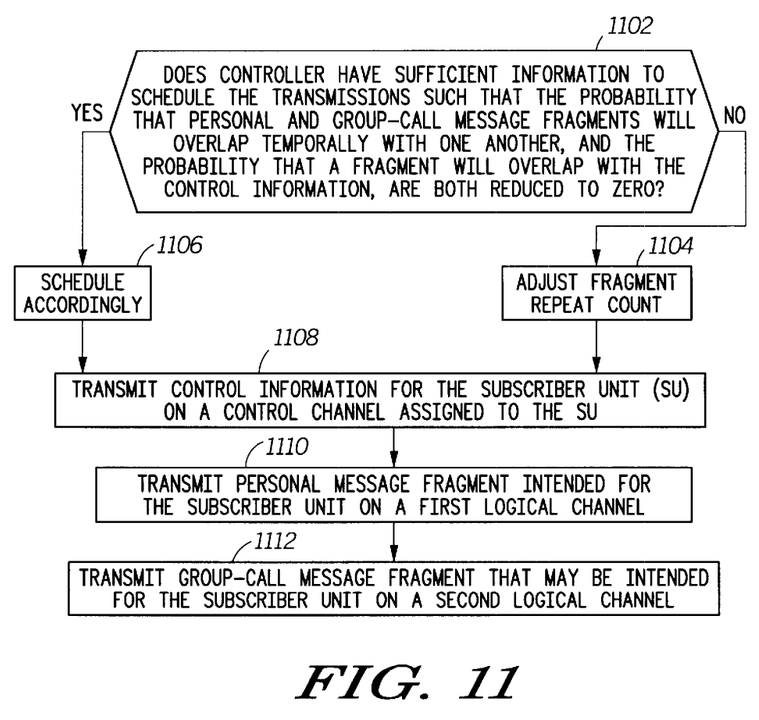
FIG. 11 is an exemplary flow diagram depicting operation of a first embodiment in accordance with the present invention.

FIG. 11 is an exemplary flow diagram depicting operation of a first embodiment in accordance with the present invention. The flow begins with the controller 112 checking 1102 whether it has sufficient information to schedule the transmissions such that the probability that personal and group-call message fragments will overlap temporally with one another, and the probability that a fragment will overlap temporally with the control information, are both reduced to zero. In one embodiment, the controller 112 is supplied with information flagging personal addresses of subscriber units 122 that do not have any IS addresses active. The controller 112 then disallows a transmission of anything other than group-call control information and group-call message fragments, and the messages intended for the subscriber units for which it is known that the group-call message fragment is not intended, on any of the plurality of logical channels that are control channels, during a time slot occupied by the group-call message fragment. In another embodiment, the messaging system stores information indicating which group-call addresses are programmed with each personal address in each subscriber unit 122. The information is made available to the controller 112 when a personal message fragment is scheduled. The controller 112 then utilizes the information to ensure selectively that the personal and group-call message fragments do not overlap temporally with one another or with the control information when sent to a group call address and a personal address both of which are active in any single subscriber unit.

If, at step 1102, the controller 112 does have sufficient information, it schedules 1106 the transmissions accordingly to prevent the overlaps. The controller 112 then transmits 1108 control information for the subscriber unit 122 on a control channel assigned to the subscriber unit 122. The controller 112 also transmits 1110 a personal message fragment intended for the subscriber unit 122 on a first logical channel, and transmits 1112 a group-call message fragment that may be intended for the subscriber unit on a second logical channel, in accordance with the schedule. The reason for the phrase "may be intended" is because the controller 112 does not always have sufficient information regarding the correspondence between a personal address and a group-call address in the same subscriber unit 122. In some embodiments in accordance with the present invention, the controller 112 knows only that it has some group-call messages to send and some personal messages to send, but it has no idea whether none, some, or all of the personal and group-call addresses are active in the same subscriber units 122. In other embodiments, the controller 112 does have sufficient information to associate a personal address and a group-call address active in the same subscriber unit 122, and can schedule the two addresses and message fragments associated therewith such that temporal overlaps are avoided.

If, on the other hand, at step 1102 the controller does not have sufficient information to schedule optimally, the controller 112 preferably adjusts 1104 a personal fragment repeat count to increase the number of times the personal message fragment will be repeated before giving up. Alternatively, the controller 112 can increment the maximum repeat count for the subscriber unit 122 to achieve the same result. In addition, as a further alternative, the controller 112 can adjust an IS fragment repeat count to increase the number of times the IS (group call) message fragment will be repeated. Flow then moves to step 1108 to begin the transmissions.

Figure 12:
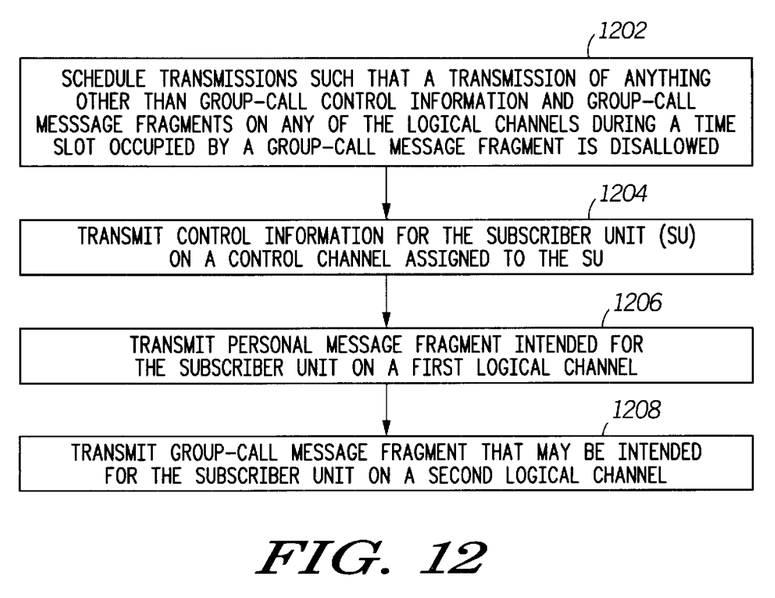
FIG. 12 is an exemplary flow diagram depicting operation of a second embodiment in accordance with the present invention.

FIG. 12 is an exemplary flow diagram depicting operation of a second embodiment in accordance with the present invention. First, the controller 112 schedules 1202 transmissions such that a transmission of anything other than group-call control information and group-call message fragments on any of the plurality of logical channels during a time slot occupied by a group-call message fragment is disallowed. The controller 112 then transmits 1204 control information for the subscriber unit 122 on a control channel assigned to the subscriber unit 122 in accordance with the schedule. The controller 112 also transmits 1206 a personal message fragment intended for the subscriber unit 122 on a first logical channel, and transmits 1208 a group-call message fragment that may be intended for the subscriber unit on a second logical channel, in accordance with the schedule.

Figure 13:
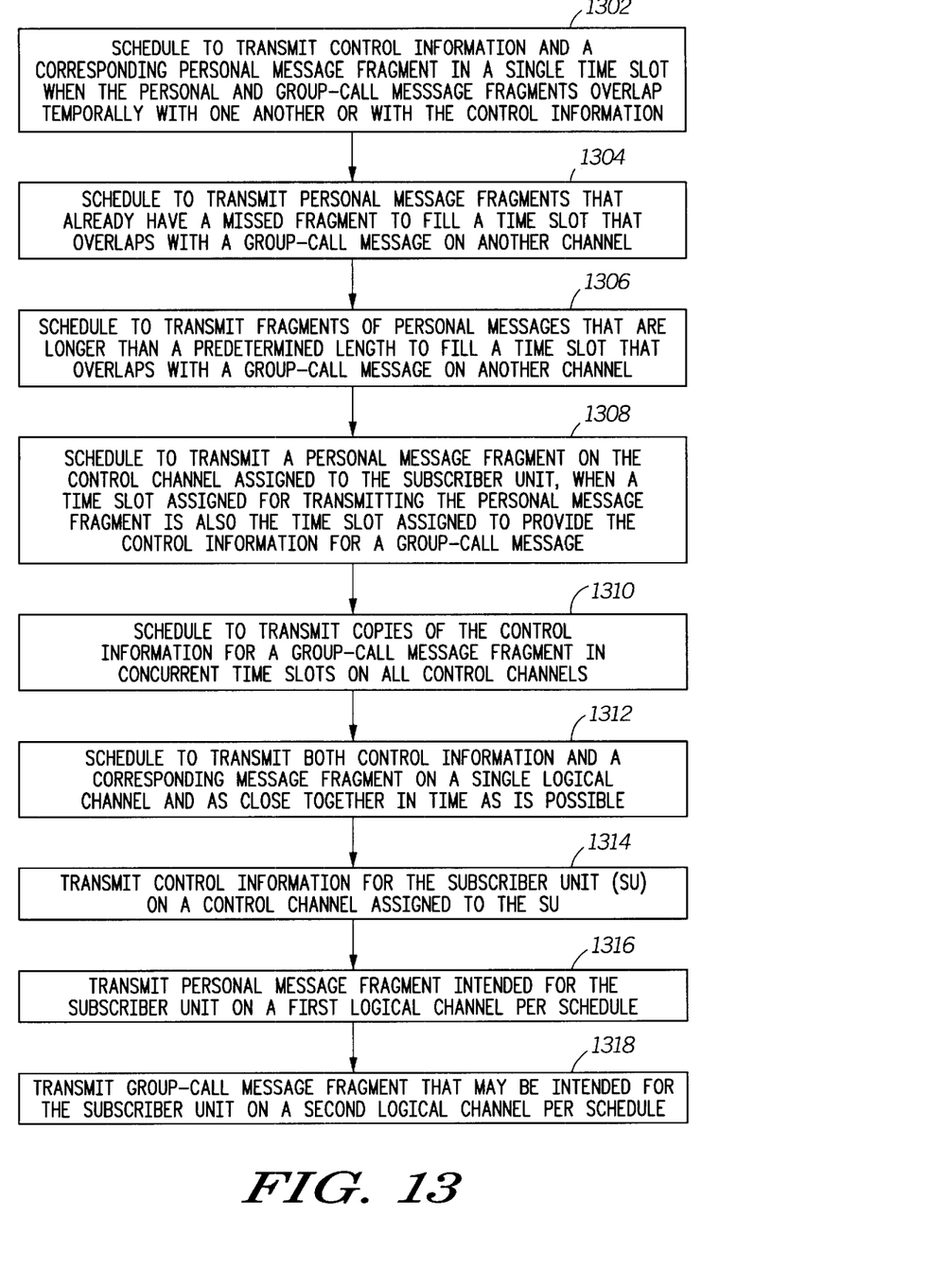
FIG. 13 is an exemplary flow diagram depicting operation of a third embodiment in accordance with the present invention.

FIG. 13 is an exemplary flow diagram depicting operation of a third embodiment in accordance with the present invention. The controller 112 schedules 1302 to transmit the control information and a corresponding personal message fragment in a single time slot when the personal and group-call message fragments overlap temporally with one another or with the control information. This measure advantageously reduces the number of messages exposed to being missed because of group-call messages, but does not eliminate the problem. The controller 112 also schedules 1304 to transmit personal message fragments that already have a missed fragment to fill a time slot that overlaps with a group-call message on another channel. This technique helps reduce overall system latency, because the message is already delayed, and one additional fragment retransmission due to possible IS overlap will not greatly increase the delay.

The controller 112 also schedules 1306 to transmit fragments of personal messages that are longer than a predetermined length to fill a time slot that overlaps with a group-call message on another channel. Again, this technique advantageously reduces overall system latency. The controller 112 also schedules 1308 to transmit a personal message fragment on the control channel assigned to the subscriber unit 122, when a time slot assigned for transmitting the personal message fragment is also the time slot assigned to provide the control information for a group-call message. This measure advantageously prevents the group-call control information from being missed due to leaving the control channel to pick up a personal message fragment on another channel.

The controller 112 further schedules 1310 to transmit copies of the control information for a group-call message fragment in concurrent time slots on all control channels. This technique also advantageously reduces the chance of the group-call control information being missed due to leaving the control channel to pick up a personal message fragment on another channel, because no matter which control channel the subscriber unit goes to for a personal message, it will find the control information for the group-call message. This technique will not work, however, if the personal message fragment is on a data-only (noncontrol) channel.

In addition, the controller 112 also schedules 1312 to transmit both control information and a corresponding message fragment on a single logical channel and as close together in time as is possible. Doing this advantageously improves the reliability of the communications. The controller 112 then transmits 1314 the control information for the subscriber unit 122 on a control channel assigned to the subscriber unit 122 in accordance with the schedule. The controller 112 also transmits 1316 a personal message fragment intended for the subscriber unit 122 on a first logical channel, and transmits 1318 a group-call message fragment that may be intended for the subscriber unit on a second logical channel, in accordance with the schedule.

Thus, it should be clear from the preceding disclosure that the present invention advantageously provides a method and apparatus that limits missed messages and high latency that can result when a mix of personal messages and group-call messages exist in a multi-channel messaging system.

Many modifications and variations of the present invention are possible in light of the above teachings. For example, some of the steps of FIGS. 11, 12, and 13 can be omitted, combined, or rearranged to form other new embodiments in accordance with the present invention. Thus, it is to be understood that, within the scope of the appended claims, the invention can be practiced other than as specifically described herein above.

What is claimed is:

1. A method for limiting message loss and message latency in a messaging system which transmits to a subscriber unit on a plurality of logical channels operating concurrently, the method comprising the steps of:

transmitting from a controller control information for the subscriber unit on a control channel assigned to the subscriber unit;

transmitting from the same controller a personal message fragment intended for the subscriber unit on a first logical channel;

transmitting from the same controller a group-call message fragment that may be intended for the subscriber unit on a second logical channel; and before the transmitting steps, scheduling the transmitting steps such that a probability that the personal and group-call message fragments will overlap temporally with one another and that either of the fragments will overlap temporally with the control information is reduced.

2. The method of claim 1, further comprising the step of adjusting a fragment repeat count when at least one of the probability that the personal and group-call message fragments will overlap temporally with one another, and the probability that a fragment will overlap temporally with the control information, is not zero after the scheduling step.

3. The method of claim 1, wherein the scheduling step comprises the step of disallowing a transmission of anything other than group-call control information and group-call message fragments on any of the plurality of logical channels during a time slot occupied by the group-call message fragment.

4. The method of claim 1, wherein the scheduling step comprises the step of disallowing a transmission of anything other than group-call control information and group-call message fragments, and messages intended for subscriber units for which it is known that the group-call message fragment is not intended, on any of the plurality of logical channels that are control channels, during a time slot occupied by the group-call message fragment.

5. The method of claim 1, wherein the scheduling step comprises the step of scheduling to transmit the control information and a corresponding personal message fragment in a single time slot when the personal and group-call message fragments overlap temporally with one another or with the control information.

6. The method of claim 1, wherein the scheduling step comprises the step of scheduling to transmit personal message fragments that already have a missed fragment to fill a time slot that overlaps with a group-call message on another channel.

7. The method of claim 1, wherein the scheduling step comprises the step of scheduling to transmit fragments of personal messages that are longer than a predetermined length to fill a time slot that overlaps with a group-call message on another channel.

8. The method of claim 1, wherein the scheduling step comprises the step of scheduling to transmit a personal message fragment on the control channel assigned to the subscriber unit, when a time slot assigned for transmitting the personal message fragment is also the time slot assigned to provide the control information for a group-call message.

9. The method of claim 1, wherein the scheduling step comprises the step of scheduling to transmit copies of the control information for the group-call message fragment in concurrent time slots on all control channels.

10. The method of claim 1, further comprising the steps of:

storing information in the messaging system to indicate which group-call addresses are programmed with each personal address in each subscriber unit; and making the information available when a personal message fragment is scheduled, wherein the scheduling step comprises the step of utilizing the information to ensure selectively that the personal and group-call message fragments do not overlap temporally with one another or with the control information when sent to a group call address and a personal address both of which are active in any single subscriber unit.

11. The method of claim 1, wherein the scheduling step comprises the step of scheduling to transmit both the control information and a corresponding message fragment on a single logical channel and as close together in time as is possible.

12. The method of claim 1, transmitting the control information and the personal and group-call message fragments from a single controller.

13. A controller for limiting message loss and message latency in a messaging system which transmits to a subscriber unit on a plurality of logical channels operating concurrently, the controller comprising:

a network interface for receiving messages to be transmitted;

a processing system coupled to the network interface for processing the messages; and a base station interface coupled to the processing system for controlling a transmitter to transmit the messages, wherein the processing system of the same controller is programmed to:

cooperate with the transmitter to transmit control information for the subscriber unit on a control channel assigned to the subscriber unit;

cooperate with the transmitter to transmit a personal message fragment intended for the subscriber unit on a first logical channel;

cooperate with the transmitter to transmit a group-call message fragment that may be intended for the subscriber unit on a second logical channel; and before enabling a transmission of the control information and the fragments, to schedule the transmission such that a probability that the personal and group-call message fragments will overlap temporally with one another and that either of the fragments will overlap temporally with the control information is reduced.

14. The controller of claim 13, wherein the processing system is further programmed to adjust a fragment repeat count when at least one of the probability that the personal and group-call message fragments will overlap temporally with one another, and the probability that a fragment will overlap temporally with the control information, is not zero after scheduling the transmission.

15. The controller of claim 13, wherein the processing system is further programmed to disallow a transmission of anything other than group-call control information and group-call message fragments on any of the plurality of logical channels during a time slot occupied by the group-call message fragment.

16. The controller of claim 13, wherein the processing system is further programmed to disallow a transmission of anything other than group-call control information and group-call message fragments, and messages intended for subscriber units for which it is known that the group-call message fragment is not intended, on any of the plurality of logical channels that are control channels, during a time slot occupied by the group-call message fragment.

17. The controller of claim 13, wherein the processing system is further programmed to cooperate with the transmitter to transmit the control information and a corresponding personal message fragment in a single time slot when the personal and group-call message fragments overlap temporally with one another or with the control information.

18. The controller of claim 13, wherein the processing system is further programmed to cooperate with the transmitter to transmit personal message fragments that already have a missed fragment to fill a time slot that overlaps with a group-call message on another channel.

19. The controller of claim 13, wherein the processing system is further programmed to cooperate with the transmitter to transmit fragments of personal messages that are longer than a predetermined length to fill a time slot that overlaps with a group-call message on another channel.

20. The controller of claim 13, wherein the processing system is further programmed to cooperate with the transmitter to transmit a personal message fragment on the control channel assigned to the subscriber unit, when a time slot assigned for transmitting the personal message fragment is also the time slot assigned to provide the control information for a group-call message.

21. The controller of claim 13, wherein the processing system is further programmed to cooperate with the transmitter to transmit copies of the control information for the group-call message fragment in concurrent time slots on all control channels.

22. The controller of claim 13, wherein the processing system is further programmed to:
   store information to indicate which group-call addresses are programmed with each personal address in each subscriber unit; and
   to utilize the information to ensure selectively that the personal and group-call message fragments do not overlap temporally with one another or with the control information when sent to a group call address and a personal address both of which are active in any single subscriber unit.

23. The controller of claim 13, wherein the processing system is further programmed to cooperate with the transmitter to transmit both the control information and a corresponding message fragment on a single logical channel and as close together in time as is possible.

24. The method of claim 13, the controller is a single controller.

25. A method in a subscriber unit for limiting message loss and message latency, comprising:
   receiving from a single controller control information on a control channel assigned to the subscriber unit;
   receiving the same controller a personal message fragment intended for the subscriber unit on a first logical channel;
   receiving from the same controller a group-call message fragment that may be intended for the subscriber unit on a second logical channel; and
   reducing the probability that the personal and group-call message fragments will overlap temporally with one another and that either of the personal and group-call message fragments will overlap temporally with the control information by receiving scheduled transmissions of the controller control information, the personal message fragment and the group-call message fragment.

* * * * *